United States Patent [19]

Nishiyama

[11] Patent Number: 5,778,365
[45] Date of Patent: Jul. 7, 1998

[54] FILE MANAGEMENT DEVICE

[75] Inventor: Kenji Nishiyama, Kawasaki, Japan

[73] Assignee: Fuji Xerox Co., Ltd., Tokyo, Japan

[21] Appl. No.: 403,964

[22] Filed: Mar. 15, 1995

[30] Foreign Application Priority Data

Mar. 16, 1994 [JP] Japan .................................. 6-045969

[51] Int. Cl.[6] ...................................................... G06F 17/30
[52] U.S. Cl. ........................................ 707/9; 707/8; 707/2
[58] Field of Search ............................ 395/600, 188.01,
395/650, 726, 934, 609; 707/9, 8, 2

[56] References Cited

U.S. PATENT DOCUMENTS 4,961,224 10/1990 Yung ............................................ 15/321
5,375,244 12/1994 McNair ...................................... 395/726

OTHER PUBLICATIONS

Novell NetWare Version 3.11 Installation NetWare User Manual, chapter 6, Mar. 1991.

*Primary Examiner*—Thomas G. Black
*Assistant Examiner*—Greta L. Robinson
*Attorney, Agent, or Firm*—Finnegan, Henderson, Farabow, Garrett & Dunner, L.L.P.

[57] ABSTRACT

The present invention provides a file management device for managing a file accessed by a plurality of users which comprises setting means for setting a plurality of attribute values related to a particular attribute of the file, and for setting access rights in accordance with the plurality of attribute values related to the attribute, storing means for storing a result set by the setting means, and changing means for changing the access rights for the file corresponding to attribute values specified in the group of the plurality of attribute values based on the contents stored in the storing means.

2 Claims, 6 Drawing Sheets

FIG. 1

| STATUS | ACCESSIBLE PERSON AND ACCESS RIGHTS |
|---|---|
| EDIT | EDITOR: ALL<br>PROJECT MEMBER: READ |
| APPROVAL | PROJECT MEMBER: READ<br>PROJECT LEADER: ALL |
| VERSION UP | PROJECT MEMBER: READ<br>PERSON IN CHARGE: ALL |

FILE MANAGEMENT DEVICE

BACKGROUND OF THE INVENTION

1. Field of the Invention

The present invention relates to a file management device and in particular relates to a file management device for managing a file accessed by a plurality of users.

2. Discussion of the Related Art

In recent years, distributed processing systems in which, for example, a file management device managing a plurality of workstations, personal computers or files are distributedly connected in distributed network, have been widespread. In the distributed processing system, a specified file in the file management device can be accessed through the plurality of workstations or personal computers. This means that a file is accessed by plural users (clients); therefore, security measures for files such as file security protection, maintaining consistency of data in a file, prevention of destruction of file or the like, should be considered in such a system.

For example, when providing security management in a file service provided by XNS (a product name of Xerox Corporation, which is an abbreviation of Xerox Network Systems), which is one of the systems such as described above, one or more access rights are selected from a group of access rights including "read", "write", "add", "remove" and "change access right". The selected access rights are associated with a file which is particular to one or a plurality of users or a group (e.g., directory). If a user needs to access a particular file, it is determined whether the access operation to the particular file is accepted according to the rights which the user has.

As a device for security management, a file management method disclosed by Japanese Patent Application Unexamined Publication No. Sho. 63-15344 is known. In this method, a file processing right comprises a combination of seven basic processing rights such as a right to change processing right, a right to delete, a right to write, a right to read and so forth, which will be set to a file or program. For example, for normal data file, a right to read the file, a right to reduce size of the file and a right to write file without changing size of the file are set. Accordingly, as regards this file, the above-described rights can be exercised, but it is impossible to delete the file, or change the value of the file processing right which has been set to the file. In the same way, file processing rights are set corresponding to the type of the file or program, such as a normal program file or readable program file. Thus, processes not corresponding to the value of the file processing right set to the file cannot be executed.

Essentially, it is required to change access right for a file as the course of file generation proceeds. It is preferable to set an access right such that other users cannot make modification during file editing, and to set an access right which prohibits all users from writing if the file is approved. That is, the access right should be automatically changed based on the status of the file.

However, neither in the security management in the file service provided by the above-described XNS, nor in the security management disclosed by the Japanese Patent Application Unexamined Publication No. Sho. 63-15344, the access rights can be changed as the status of the file changes.

Consequently, in the above-described conventional arts, the access right corresponding to the status of the file cannot be set; therefore, appropriate security management for the file is unavailable.

SUMMARY OF THE INVENTION

The present invention has been made in view of the above circumstances and has as an object the provision of a file management device in which an access right is changed in accordance with the change of the value related to setting of the access right set to an attribute of the file.

Additional objects and advantages of the invention will be set forth in part in the description which follows and in part will be obvious from the description. The objects and advantages of the invention may be realized and attained by means of the instrumentalities and combinations particularly pointed out in the appended claims.

To achieve the objects and in accordance with the purpose of the invention, as embodied and broadly described herein, the file management device of this invention comprises setting means for setting a plurality of attribute values related to a particular attribute of the file, and for setting access rights in accordance with the plurality of attribute values related to the attribute, storing means for storing a result set by the setting means, and changing means for changing the access rights for the file corresponding to attribute values specified in the group of the plurality of attribute values based on the contents stored in the storing means.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention. In the drawings.

DETAILED DESCRIPTION OF THE PREFERRED EMBODIMENTS

Preferred embodiments of a file management device according to the present invention are now described in detail based on the drawings.

First Embodiment

A first embodiment is now described referring to FIGS. 1-4.

Figure 1:
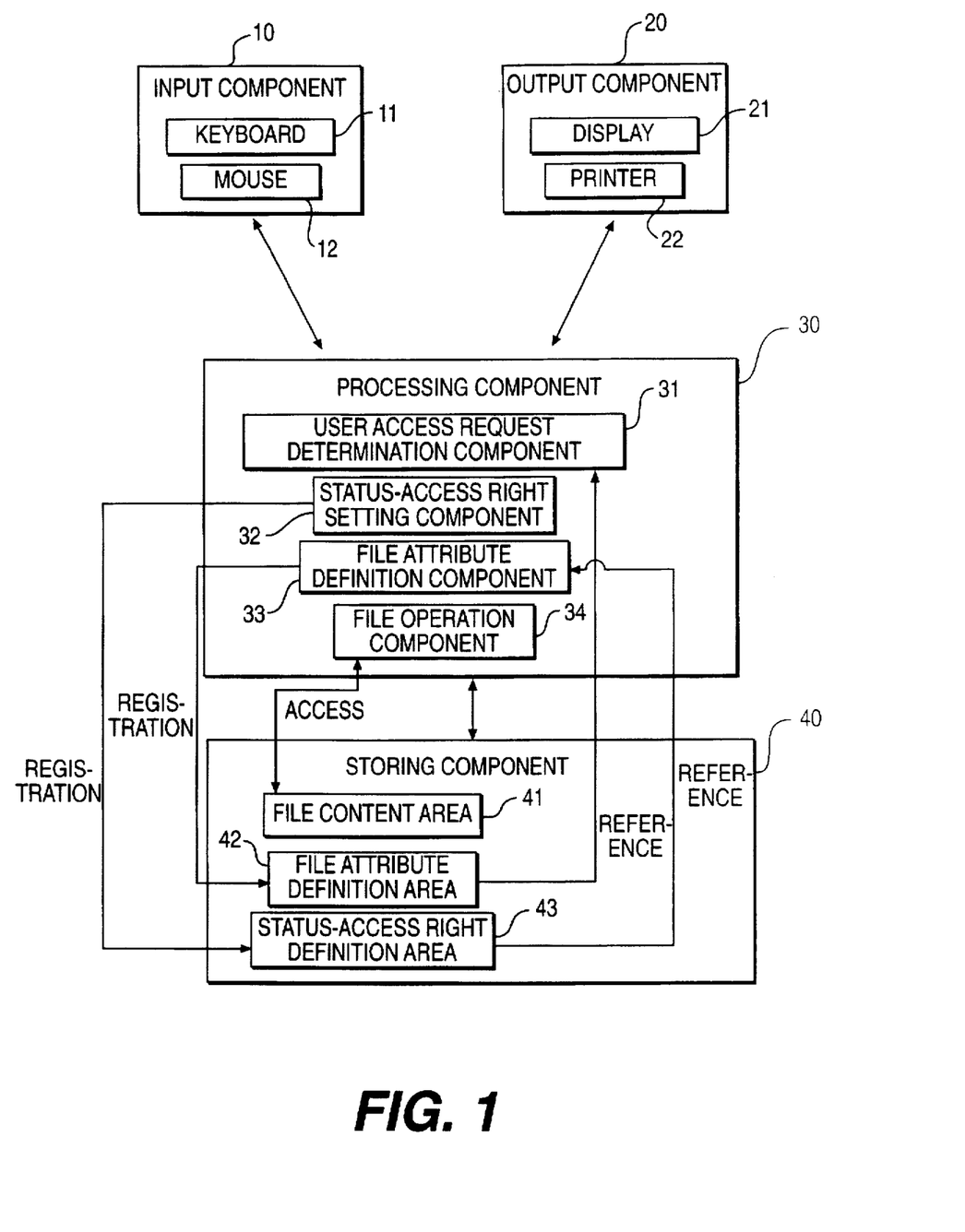
FIG. 1 is a functional block diagram showing a first embodiment of a file management device according to the present invention.

FIG. 1 is a functional block diagram showing the first embodiment of a file management device according to the present invention.

In the figure, the file management device comprises an input component 10, output component 20, processing component 30 and storing component 40.

The input component 10 includes a keyboard 11 and a mouse 12 for inputting data or direction, or setting definition of an access right.

The output component 20 comprises a display 21 and a printer 22.

The processing component 30 comprises a user access request determination component 31 for determining the access right for the file referring to the contents of the access right when request for accessing the file is received, a status-access right setting component 32 for setting a pair of a file status and an access right, file attribute definition component 33 for changing the access right together with the changing the file status, and a file operation component 34 for accessing the file.

The storing component 40 comprises a file content area 41 for storing the contents of the file, a file attribute definition area 42 for storing status of each file as its attribute and the access right of each file, and a status-access right definition area 43 for storing the pair of the change of the file status and the access right to be changed in accordance with the change of the file status (hereinafter, referred to as status-access right definition).

Here, the access right includes "read", "write", "add", "remove", "change access right", "reference" and so forth.

Figure 2:
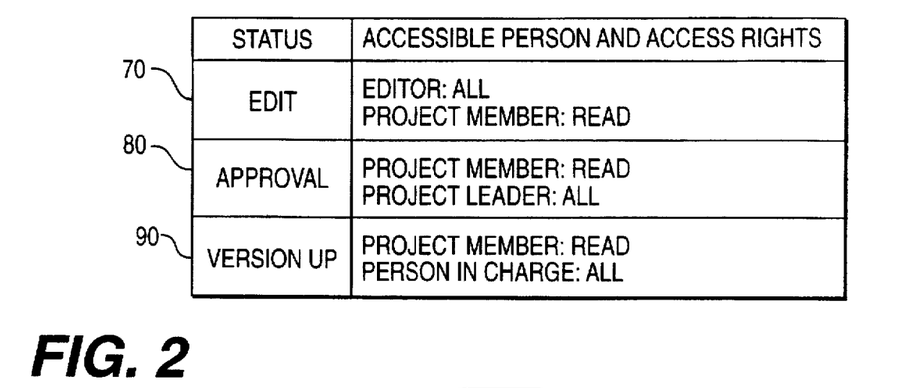
FIG. 2 is a table showing an example of status-access right definition.

FIG. 2 shows an example of a method of storing status-access right definition in the status-access right definition area 43, which is shown in the form of a table of the file status and the accessible person. As the file status, "edit", "approval" and "version up" are indicated. In entry 70, namely, during the edit, all access rights described above are permitted to the editor, a read right is permitted to the project members (group), and no access right is permitted to the other users. In entry 80, that is, after the file is approved, the read right is permitted to the project members, all access rights are permitted to the project leader, and no access right is permitted to the other users. In entry 90, as the file is revised, the read right is permitted to the project members, all access rights are permitted to the person in charge (a person or a group), and no access right is permitted to the other users.

Figure 3:
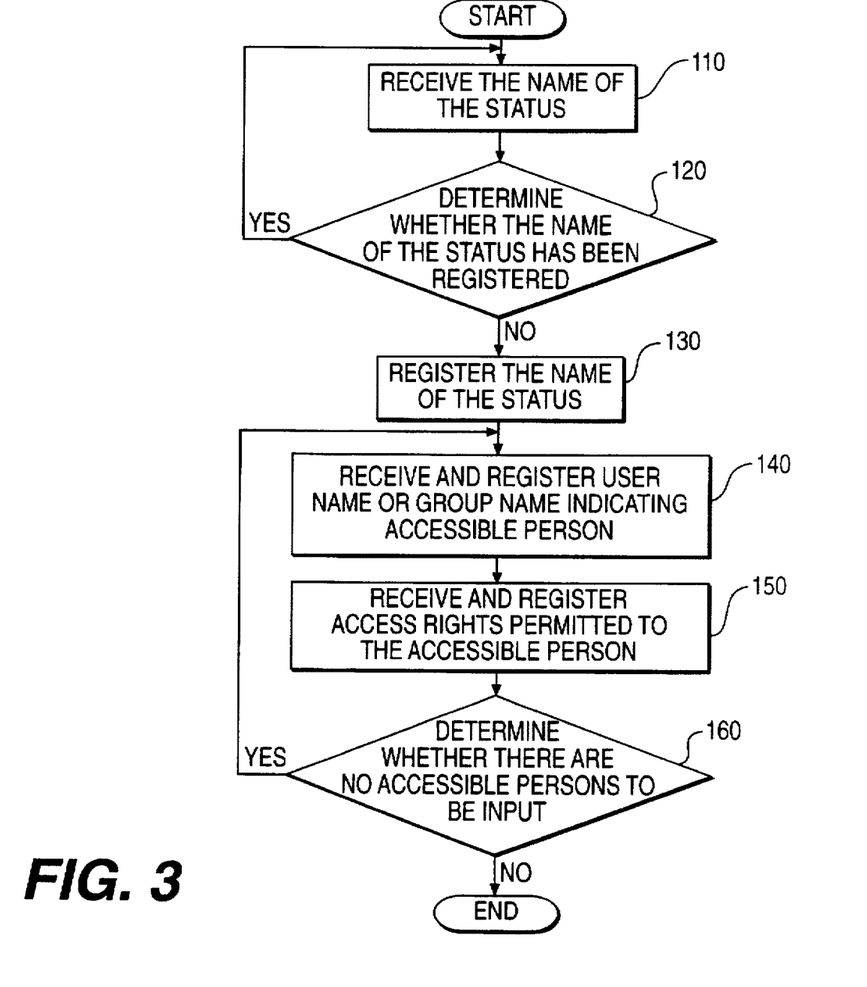
FIG. 3 is a flow chart showing an operation of status-access right definition setting process.

Next, generating and processing operation of status-access right definition in the status-access right setting component 32 is described based on the flow chart in FIG. 3, using setting a pair of the file status and the access rights as an example.

A user inputs a name of the file status, accessible persons and access right by operating the inputting component 10.

When the name of the status, for example, "edit" is received from the input component 10 (step 110), the processing component 32 determines whether the name of the status has already been registered at the status-access right definition area 43 (step 120).

If it is determined to have been registered at step 120, re-input of the name of the status is demanded. If it has not been registered yet, received name of the status (in this example, "edit") is registered at the status-access right definition area 43 (step 130). A user name or group name indicating an accessible person corresponding to the file status (for example, "editor") is received from the inputting component 10, and registered at the status-access right definition area 43 corresponding to the file status described above (step 140). At the same time, access rights permitted to the registered accessible person (for example, all access rights) are received from the inputting component 10, and registered at the status-access right definition area 43 corresponding to the above accessible person (step 150). It is determined whether more accessible persons are to be input from the inputting component 10, that is, whether the purport that input of the access right is finished is input (step 160).

If there are more accessible persons to be input, steps subsequent to step 140 are carried out. For example, if "project members" is input as the accessible person and "read right" is input as the access right corresponding thereto, steps 140 and 150 are carried out.

On the other hand, if the purport that the input of the access right is finished is input in step 160, the process is completed.

The contents stored in the status-access right definition area 43 in the case where access rights for the status of file editing is set is shown as the entry 70 in FIG. 2.

If it is desired to register information for pairs of status and access right shown in FIG. 2, it can be achieved by carrying out the process of registering the access rights for the file statuses "approval" and "version up" according to the procedures shown in FIG. 3.

Figure 4:
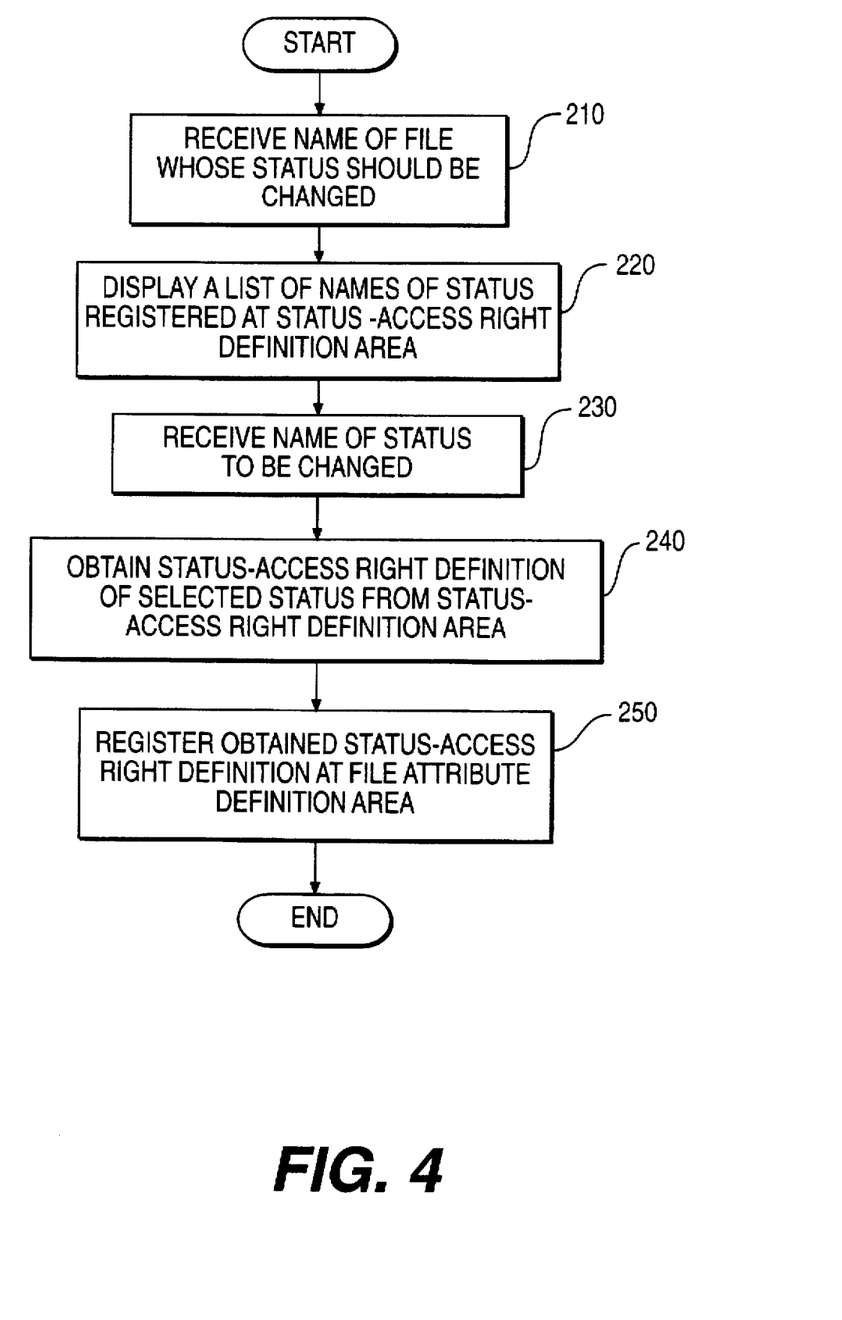
FIG. 4 is a flow chart showing an operation of access right changing process in the first embodiment.

A process for changing the access right by the file attribute definition component 33 is described using the flow chart in FIG. 4.

Here, the process of changing the file status and access right according thereto is described.

In the first embodiment, supposing that a new file is generated and in the course of generation, the file status is changed to "version up" by indication provided by the user. In an early stage of the file generation, the status and access right definition shown in the entry 70 in FIG. 2 is stored as the file attribute in the file attribute definition area 42.

Next the process in the case where the file status is changed from "edit" to "version up" during editing by the user is described.

By operating the inputting component 10, the user inputs the name of the file which he/she desires to change the status, and the name is input to the file attribute definition component 33. On receiving the file name (step 210), the file attribute definition component 33 reads out names of the status from the status-access right definition area 43, and displays a table of the names of status (namely, a list of the names of status in the status-access right definition shown in FIG. 2) on a display 21 of the output component 20 (step 220).

By operating the input component 10, the user inputs the name of the status "approval", and the name of the status is input to the file attribute definition component 33. On receiving the input name of the file status (step 230), the file attribute definition component 33 obtains a status-access right definition corresponding to the name of the status from the status-access right definition area 43 (step 240). At the same time, the obtained status-access right definition is registered at the file attribute definition area 42 (step 250).

According to the foregoing description, the process of changing the file status and access rights for the file according thereto is completed.

In the process up to this point, the status-access right definition of the entry 80 shown in FIG. 2 has been registered at the file attribute definition area 42 as the file definition.

In the case of "approval" file status as described above, as clear from the entry 80 shown in FIG. 2, all access rights are permitted only to a project leader. Therefore, if the above-described editor of the file makes a request for an access right to modify the file, the request for the access right is input to the user access request determination component 31, which reads attributes (status-access right definition) defined in the file attribute definition area 42 and the contents of the access rights for these attributes with the contents of the requested access rights. In this embodiment, an access right related to "modification" is not included in the access rights for the attributes (status-access right definition); consequently, user access request determination component 31 makes a display to the purport that the access right is not permitted on the display 21 of the output component 20.

To the contrary, if the project leader makes a request for the "modification" of file or a request for the access right to change the file status (namely, the change from "approval" to "version up"), the access right is permitted to him/her. Therefore, the project leader can change the file status from "approval" to "version up". To carry out this operation for changing, as same as described above, the procedures shown in FIG. 4 are executed.

According to the first embodiment described thus far, every access right can be defined by each file status, namely, each value of the attributes. When a file is actually generated, the status of the file varies in the course of the file generation (for example, edit, approval, version up or the like), and access rights corresponding to the status are set to the file; therefore, the access rights can be changed correspondingly to the change of the value of the file status. Thus, it is possible to manage the access right in accordance with the file status.

Second Embodiment

A second embodiment will be described in detail referring to FIGS. 5–8.

Figure 5:
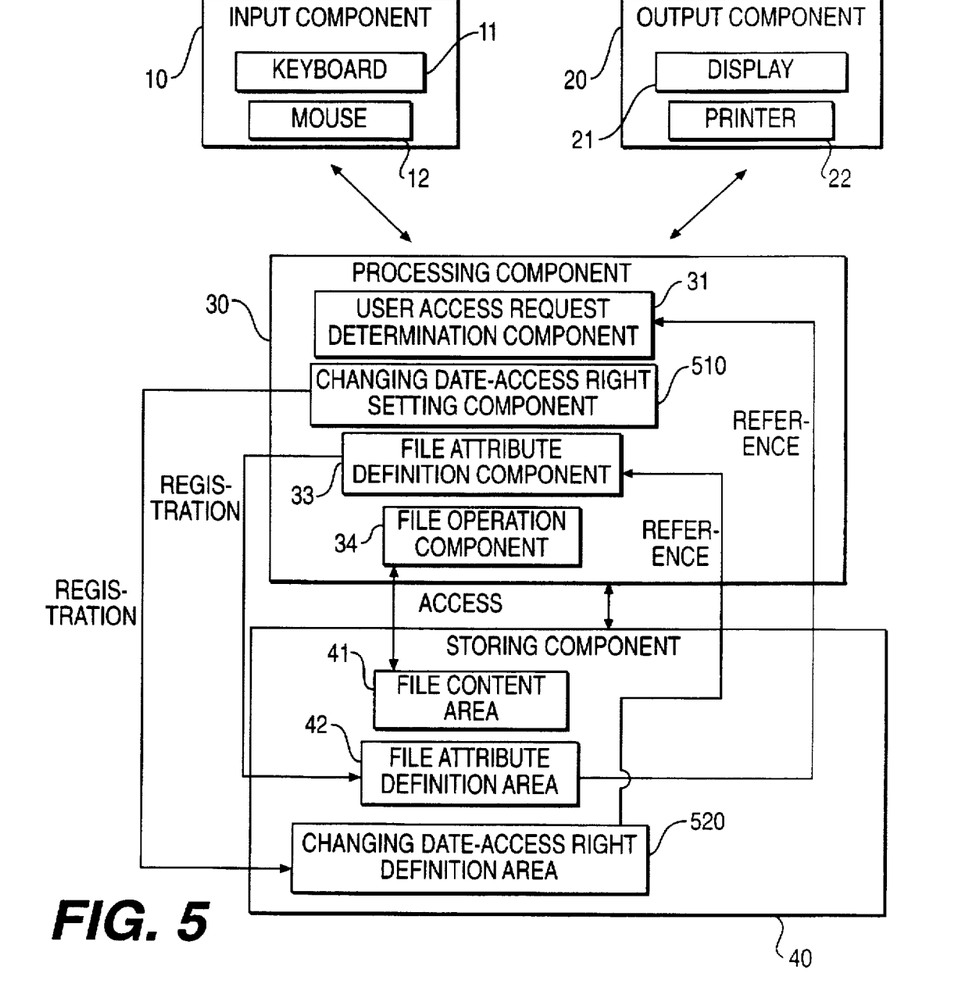
FIG. 5 is a functional block diagram showing a second embodiment of a file management device according to the present invention.

FIG. 5 is a functional block diagram showing a second embodiment of the file management device according to the present invention. The second embodiment has the construction which is similar to that of the first embodiment shown in FIG. 1, and substitutes a changing date-access right setting component 510 and a changing date-access right definition area 520 for the file attribute definition component 33 and status-access right definition area 43, respectively.

The changing date-access right setting component 510 sets a changing date of a file and access right for the file. The changing date-access right definition area 520 makes a pair of changing date of the file and the access right which have been set (hereinafter, the pair is referred to as the changing date-access right definition) and stores it.

Figure 6:
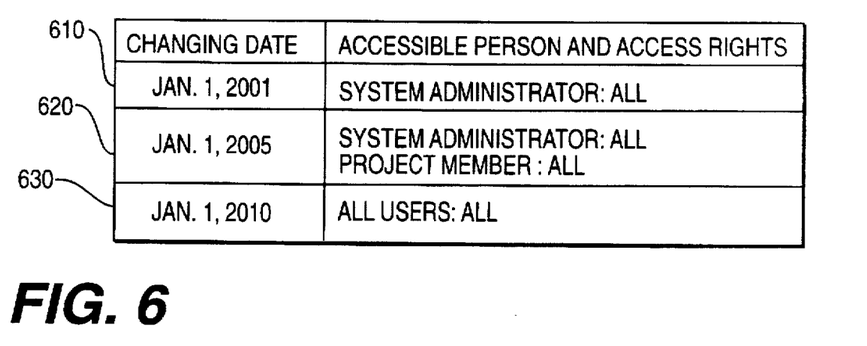
FIG. 6 is a table showing an example of changing date-access right definition.

FIG. 6 shows an example of a method of storing the changing date-access right definition, in which the accessible person and the access right for each changing date of the file are indicated in a form of the table. For example, in the entry 610, the changing date of the file is Jan. 1, 2001, and if it is on or after Jan. 1, 2001, the access right is changed so that all access rights are permitted only to a system administrator, that is, no access right is permitted to users other than the system administrator. Such definition contents are also set in the entries 620 and 630. In the example of FIG. 6, from Jan. 1, 2001 to Dec. 31, 2004, the access right corresponding to the changing date of Jan. 1, 2001 is applied, from Jan. 1, 2005 to Dec. 31, 2009, the access right corresponding to the changing date of Jan. 1, 2005 is applied, and, from Jan. 1, 2010, the access right corresponding to the changing date of Jan. 1, 2010 is applied.

As described above, the second embodiment is basically the same as the first embodiment. However, in the second embodiment, the access right is changed in accordance with the changing date of the file though the access right is changed in accordance with the file status in the first embodiment.

Figure 7:
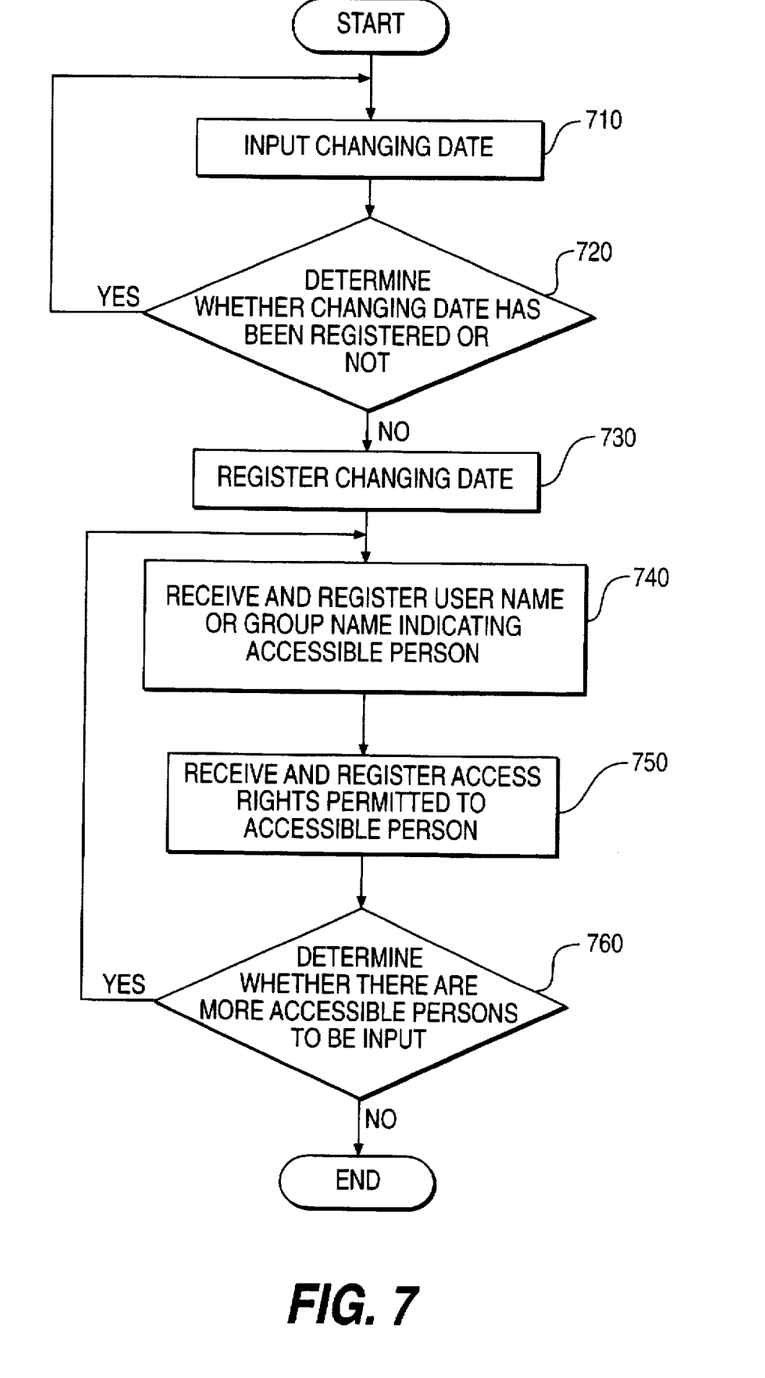
FIG. 7 is a flow chart showing an operation of changing date-access right definition setting process.

Next, operation of access right setting process in the second embodiment is described based on a flow chart in FIG. 7.

A user inputs a changing date, accessible persons and access rights by operating the inputting component 10.

On receiving the changing date, for example, "Jan. 1, 2001" from the inputting component 10 (step 710), the processing component 32 determines whether the changing date information has already been registered at the changing date-access right definition area 520 (step 720).

If it is determined to have been already registered in step 720, re-input of the changing date is demanded. If it has not been registered yet, the received changing date (in this example, Jan. 1, 2001) is registered at the changing date-access right definition area 520 (step 730). After that the user name or group name indicating the accessible person corresponding to the changing date (for example, the system administrator) is received from the inputting component 10, and is registered at the changing date-access right definition area 520 in accordance with the above changing date (step 740). At the same time, access rights permitted to the registered accessible person (for example, all access rights) are received from the inputting component 10, and are registered at the changing date-access right definition area 520 in accordance with the above accessible person (step 750). Then it is determined whether more accessible persons will be input from the inputting component 10, that is, whether the purport that the input of the access rights is completed or not has been input (step 760).

If it is determined that there are more accessible person to be input, processes subsequent to step 140 described above are carried out. If it is determined that the purport that the input of the access rights is completed is input, the process is finished.

Thus, the access rights for the changing date as the file attribute are set and stored in the changing date-access right definition area 520 as shown in FIG. 6.

Figure 8:
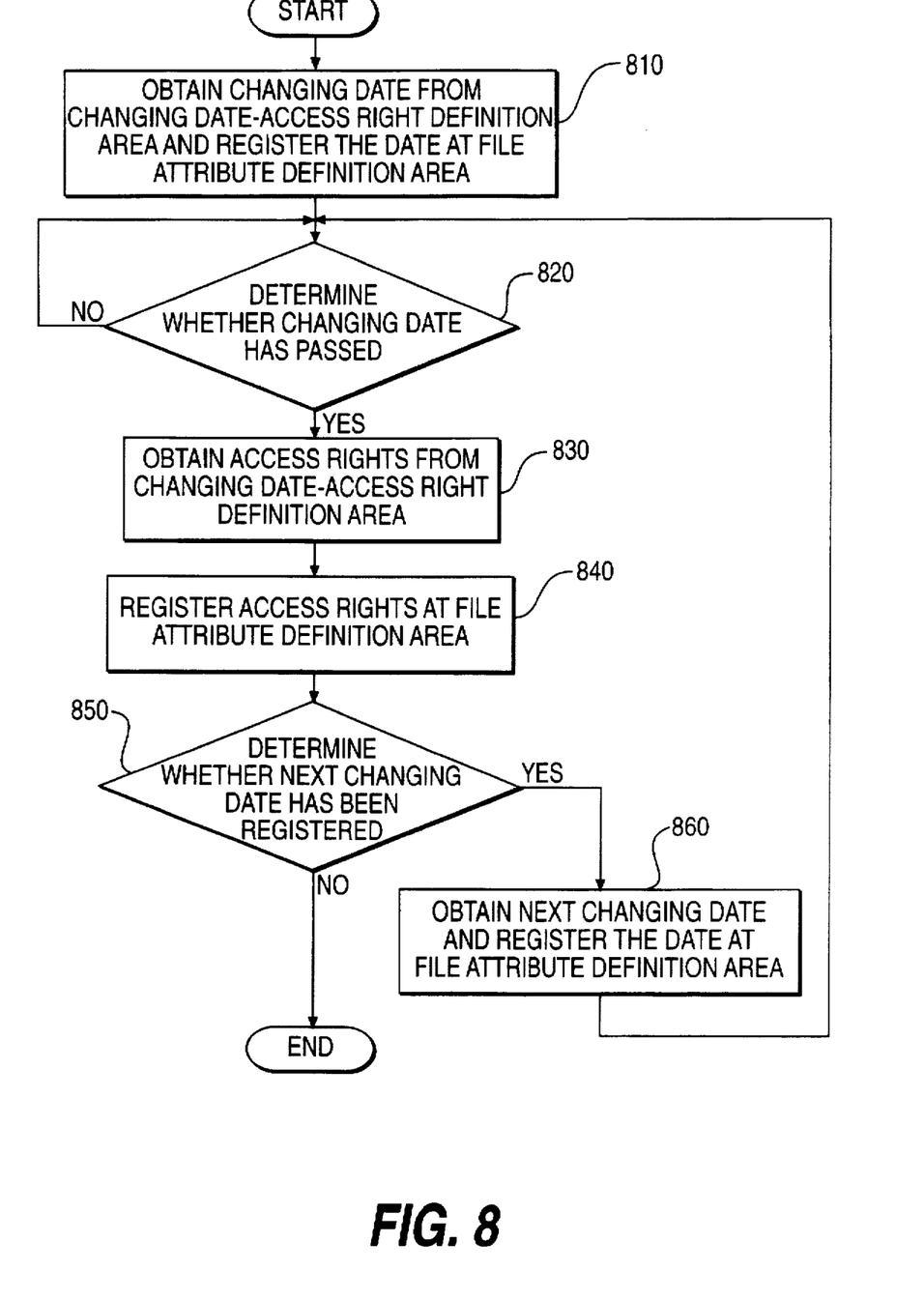
FIG. 8 is a flow chart showing an operation of access right changing process in the second embodiment.

The operation of access right changing process from setting the changing date of the file to the change of access right beyond the changing date is now explained based on the flow chart in FIG. 8.

Supposing that all access rights are permitted to the project members until the changing date of Jan. 1, 2001.

As an initial process, the file attribute definition component 33 obtains a first defined changing date, namely, the changing date which first comes around (in this example, "Jan. 1, 2001" in the entry 610) from the changing date-access right definition (see FIG. 6) set in the changing date-access right definition area 520, and registers the changing date at the file attribute definition area 42 (step 810). At the point, the changing date "Jan. 1, 2001" and the purport that all access rights are permitted to the project members are stored in the file attribute definition area 42.

After completing step 810, the file attribute definition component 33 determines whether the above changing date has passed (step 820). If it has not passed, the file attribute definition component 33 repeats determination as to whether the above changing date has passed or not. If the changing date has passed, the file attribute definition component 33 obtains the access rights (in this example, the access rights in the entry 610) from the changing date-access right definition area 520 (step 830), and registers the access rights at the file attribute definition area 42 (step 840).

The file attribute definition component 33 also determines whether next changing date is registered at the changing date-access right definition in the changing date-access right definition area 520 (step 850).

If it is registered, next changing date (in this example, "Jan. 1, 2005" in the entry 620) is obtained and registered at the file attribute definition area 42 (step 860), which means that the changing date is updated. After that, the processes subsequent to step 820 are repeated. If the next changing date is not registered, the process is finished.

At this point, the changing date of "Jan. 1, 2005" and the purport that all access rights are permitted only to the system administrator are registered at the file attribute definition area 42. Accordingly, up to Jan. 1, 2005, all access rights are permitted only to the system administrator and procedures shown in FIG. 8 are carried out. If the changing date has passed, the access rights are changed to those corresponding to the changing date of Jan. 1, 2005 shown in FIG. 6.

As shown in the foregoing description, according to the second embodiment, a pair of the changing date and access rights can be defined as the file attribute, and the access rights are changed based on the determination as to whether the changing date has passed; and therefore, the access rights can be automatically changed as time goes by. That is, it is possible to manage the access rights in accordance with the changing date of the file.

The first and second embodiments have described the stand-alone case, but the distributed processing may be carried out by the distributed processing system in which clients making the request for the access rights and a system including the processing component 30 and the storing component 40 are located in a network. To be more detail, a client-server system is constructed, and in response to the request from the client, the above system as a server makes determination as to whether the access rights are permitted, and the determination is returned to the client. It is also clear that the present invention can be applied to a system of peer-to-peer type.

As shown in the above detailed description, according to the present invention, plural attribute values related to a particular attribute of a file which has been set by setting means and access rights corresponding to the plural attribute values are stored in storing means. Changing means changes the access rights corresponding to an attribute value specified in the group of the plural attribute values based on the contents stored in the storing means; therefore, the access rights can be changed in accordance with the change of the value related to setting of the access rights which have been set to the file attribute. Thus, management of the file, namely, security management is possible according to the change of the value of the file attribute.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A file management device for managing a file accessed by a plurality of users, comprising:

means for processing a file access request from one of said plurality of users;

means for processing a plurality of file attributes;

means for associating a user access right with a file status for the file in accordance with said file access request and said plurality of file attributes, said file status attribute indicating a stage of file generation;

means for storing said user access right associated with said file status; and means for changing automatically said user access right when said file status changes.

2. A file management device for managing a file accessed by a plurality of users, comprising:

means for processing a file access request from one of said plurality of users;

means for processing a plurality of file attributes;

means for associating a user access right with a date for the file in accordance with said file access request and said plurality of file attributes;

means for storing said user access right associated with said date; and means for changing automatically said user access right when said date changes.

* * * * *